United States Patent Office 3,684,475
Patented Aug. 15, 1972

3,684,475
FLOAT GLASS APPARATUS FOR PRODUCING SHEET GLASS CRYSTALLINE MATERIAL FROM A GLASS BAND
Konstantin Timofeevich Bondarev, Kiev, Mikhail Ivanovich Kozmin and Anatoly Gavrilovich Minakov, Konstantinovka Donetskoi Oblasti, Vladimir Ivanovich Minin, Donetsk, and Grigory Iosifovich Mitkevich and Anatoly Vasilievich Strekalov, Konstantinovka Donetskoi Oblasti, U.S.S.R., assignors to Ordena Trudovogo Krasnogo Znameni Zavod "AVTOSTEKLO," Konstantinovka Donetskoi Oblasti, U.S.S.R.
Filed Oct. 29, 1968, Ser. No. 771,436
Int. Cl. C03b 18/00
U.S. Cl. 65—182 R
4 Claims

ABSTRACT OF THE DISCLOSURE

A band of glass is introduced onto a liquid bath at one end of a tank and is advanced along the bath while being subjected to thermal treatment, so as to be solidified at the other end of the tank where the band is raised from the bath above the sill at the outlet end of the tank. The bath is circulated in the tank and travels in longitudinal open channels at the bottom of the tank. At the inlet of the tank, the bath is returned to a chamber wherefrom the bath travels over a sill into the tank, the glass band being introduced onto the bath at the sill.

The present invention relates to methods of producing sheet crystalline material from a glass band and also to a bath for effecting said method.

Known in the art is a method of producing glass crystalline material, according to which a glass band is crstallized in the course of thermal treatment on the roller conveyor of the crystallizer. By such a method glass crystalline material is produced from a glass band whose composition comprises costly fluorine.

When using other glass composition, in the course of thermal treatment on the roller conveyor the glass band is subject to sagging, deformation and breaking.

Also known in the art is a method of producing sheet glass, according to which a glass melt is poured onto molten metal contained in a bath, which glass melt, uniformly spreading over the metal surface, is shaped into a glass band.

Attempts were made to effect thermal treatment of the glass band in the bath for producing sheet glass and thus to obtain glass crystalline material therefrom.

These attempts, however, failed to yield positive results, since the crystallized glass band whose temperature upon emerging from the bath is 600–700° C., is less ductile than the glass at the same temperature, and at the moment of passing over the bath sill it became damaged. Known in the art are baths for producing sheet glass on the surface of molten metal circulating in the bath.

The bottom of such baths is usually flat. The upper layer of the metal circulating in the bath, due to friction when in contact with the side walls of the bath, acquires different rate of travel over the width of the flow (which is greater in the middle portion and smaller at the edges).

When producing sheet glass crystalline material in such a bath, these features of the moving molten metal result in the formation of a lamellar structure of material crystallized in the bath and sometimes in breakage of the band.

Origination of crystal nuclei in the glass band of the same chemical composition in all its points but with the lamellar structure proceeds differently, and therefore the glass crystalline material proves to be non-uniform as to the structure and strength.

Moreover, in such baths in the place of receiving the pumped metal the metal was observed to bubble, which phenomenon caused disturbances in its surface.

When producing glass crystalline material from a glass band which moved along the disturbed surface of molten metal, the glass band profile was disturbed, the band became wavy and of non-uniform thickness.

It is an object of the present invention to eliminate said disadvantages.

The main object of the present invention is to provide such a method of producing sheet glass crystalline material from a glass band, which will make it possible, irrespective of the capability of the glass composition to become crystallized, to obtain a high-quality band of glass crystalline material, and also to provide such a bath for effecting said method, which will ensure free travel of the crystallized band from the bath over the sill of its end face wall for further thermal treatment and which will make it possible to obtain glass crystalline material in the shape of a continuously moving uniform band having a uniform fine-grain structure, uniform thickness and strength over the entire width thereof.

Said object is accomplished due to the fact, that when producing sheet glass crystalline material from a glass band that crystallizes in the course of thermal treatment, according to the invention, the thermal treatment of the glass band up to its complete crystallization is effected when it moves along the surface of molten metal contained in the bath.

It is expedient that the molten metal in the bath should be kept moving in a stream together with the band of material produced.

In the bath adapted to effect the proposed method a plurality of transverse rolls is installed in a cascade, that lift the crystallized band above the molten metal at an angle of 0°10′ to 0°20′ when delivering it over the sill of the end face wall for further thermal treatment.

For the rate of travel of the molten metal to be uniform over the width of the bath, the bottom of the proposed bath should be made with a plurality of parallel longitudinal open channels.

The bath in which the molten metal circulation is envisaged, is expedient to be made at the place of entrance of the glass band with a chamber to receive the pumped metal, the chamber communicating with the bath, the bottom in the front portion of the bath being made with a sill.

For a better understanding of the essence of the present invention, the description which follows should be read with reference to the accompanying drawing illustrating an exemplary embodiment of a bath for producing sheet glass crystalline material, wherein.

Figure 1:
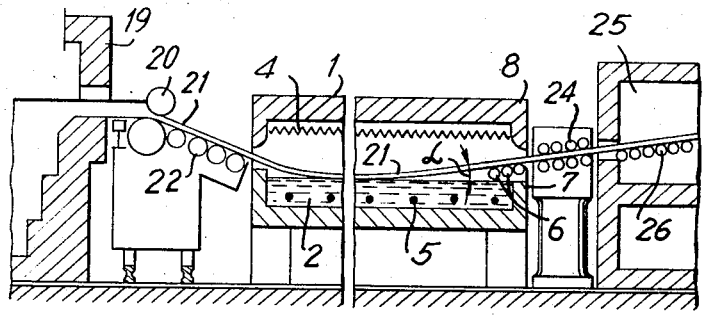
FIG. 1 shows a longitudinal section of the bath, according to the invention.
Figure 3:
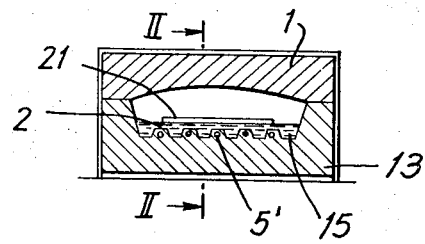
FIG. 3 is a section taken along line III—III in FIG. 2.
Figure 2:
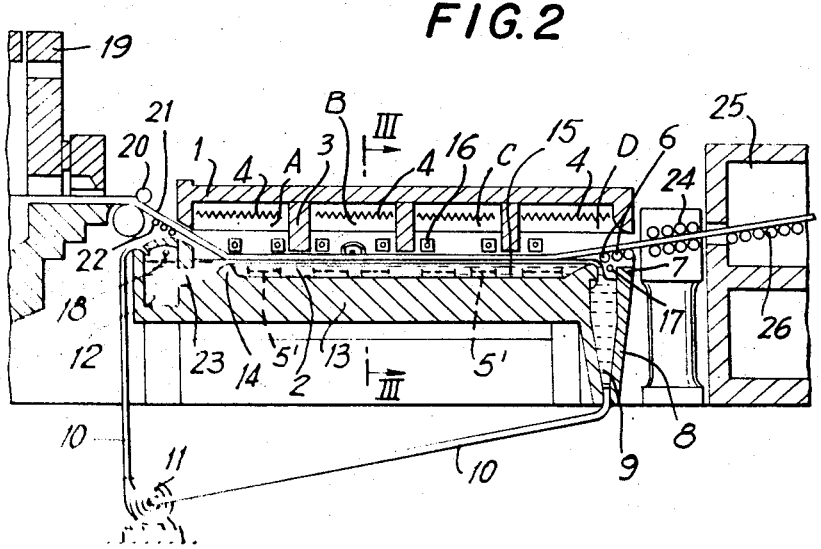
FIG. 2 shows another version thereof as taken in section on line II—II in FIG. 3.

Bath or tank 1, shown in FIGS. 1, 2, 3 containing molten tin 2 comprises: in the upper portion thereof partitions 3 (FIG. 2; in FIG. 1 these partitions are not shown), which divide the gas space of the bath, filled with nitrogen, into zones A, B, C, D provided with electric heaters 4 (FIGS. 1, 2). Electric heaters 5 (FIG. 1) are arranged in the lower portion of the bath, and a plurality of transverse rolls 6 installed at the outlet of the bath (FIG. 1), said rolls being of the same diameter.

The rolls 6 are arranged above the molten tin 2 in a cascade, that is, in such a manner, that their common tangent is inclined to the longitudinal axis of the bath 1 at an angle α equal to 0°10'–0°20', rising towards the exit of the band from the bath. A portion of the plurality of the rolls 6 is disposed above sill 7 of the rear end face wall 8.

In the rear end face portion of the bath 1 a chamber 9 is provided (FIG. 2) for draining the tin pumped along pipelines 10 by a pump 11, and in the front end face portion of the bath a chamber 12 is provided for receiving the tin delivered by the pump 11.

In the front portion of the bath 1 its bottom 13 is provided with a sill 14 and with longitudinal parallel open channels 15 over the entire length of the bath (FIG. 3).

To preclude reaction between the molten tin and gases above it, it is envisaged to feed heated protective gas into the bath, for example, nitrogen, which is admitted thereinto through openings 16 in the bath walls and through openings 17 and 18 made in the walls of the chambers 9 and 12, respectively.

When producing sheet glass crystalline material, the glass melt delivered from a glass-making furnace or lehr 19 is shaped by rolls of a rolling machine into a glass band 21 which is transported by driven rolls 22 into the bath 1.

The proposed method of producing glass crystalline material consists in the following.

The glass band 21 fed into the bath 1 and having a temperature of 600 to 850° C. is placed onto molten tin by means of a device arranged behind the bath (not shown in the drawing), and is drawn over the tin surface.

The movement of the glass band in the course of crystallization along the surface of the molten metal together with the latter precludes friction between the glass and the metal and is thus instrumental for improving the quality of the bottom surface of the band of glass crystalline material.

In baths where circulation of the molten metal is envisaged, due to the provision of the chamber 12 (FIG. 2) to receive the pumped metal, which chamber communicates with the bath 1, and due to the provision of the sill 14 in the bottom 13 of the bath at the entrance of the glass, the tin moves smoothly and has an even surface.

The process is as follows.

Molten tin pumped by the pump 11 is fed to the chamber 12 of the bath 1. The hydrodynamic jet of the tin, emerging from the pipeline 10 produces a turbulent flow in the chamber 12. Through a passage 23 the molten tin arrives in the bath 1 and reaches the sill 14 of the bottom 13.

The turbulent flow of the tin is attenuated by the sill 14 and the tin travels further along the bath in a quiescent flow.

The laminar flow of the molten tin provides favorable conditions for obtaining an even band of glass crystalline material, featuring a uniform thickness throughout its width.

With the help of the electric heaters 4 and 5' in the front portion of the bath (zone A in FIG. 2) the temperature of the gas medium and tin is maintained (600 to 850° C.) as required for origination of crystal nuclei in the glass.

The rate of the band travel is so selected as to provide for completion of the process of origination of crystal nuclei in zone A.

Due to the provision of the parallel channels 15 the flow of molten tin is subdivided over the width into several streams, which ensures a uniform distribution of the velocities of the moving tin over the entire flow (that is, a stabilized hydraulic flow is created), whereas the electric heaters 5' provide for a uniform distribution of the flow temperature (an isothermal flow being thus created).

The hydraulically stabilized isothermal flow of the molten metal moving together with the glass band being crystallized creates favorable conditions for producing a uniform fine-grain structure and of a uniform strength over the entire width.

Then the glass band passes into zone C, where main crystalline phases are formed, through intermediate zone B where the temperature (also with the aid of the heaters 4, 5) is raised to 800–1350° C.

In the zone C the band travels at a temperature of 800–1350° C.

At this temperature the viscosity of the glass diminishes to 6–7.5 poise and the band acquires plasticity.

Then the viscosity of the glass rapidly increases, partially crystallized material solidifies and loses its plasticity.

Due to the fact, that the band of the glass crystalline material, when moving in the bath over the molten tin, bears against it with its entire bottom surface, it is not deformed in the course of crystallization.

On completion of the process of crystallization, the temperature in zone D is made to drop to 600–700° C. The band of the glass crystalline material is then in a completely solidified state.

At this moment the crystallized band 21 encounters the plurality of rolls 6 disposed at the outlet of the bath 1, is smoothly lifted at an angle of 0°10'–0°20', and is delivered over the sill 7 of the end face wall 8 of the bath onto the driven rolls 24 that transport the band 21 to an annealing furnace 25 with rolls 26.

The rolls 24 and the rolls 26 are arranged so as to be a continuation of the inclined row of the rolls 6. This ensures a free exit of the crystallized glass band from the bath 1 over the sill 7 in the face end wall 8, thus providing for its integrity.

After annealing in the furnace 25, the band of the glass crystalline material is cut into sheets of required sizes.

What is claimed is:

1. Apparatus for producing sheet glass comprising an elongated tank containing a molten metal bath, means for introducing a band of glass onto the bath at one end of the tank, said band advancing along the bath towards the other end of the tank, means for heating the bath along the length of the tank to effect thermal treatment of the band and solidification of the band at said other end of the tank, a plurality of rolls arranged in cascade at said other end of the tank to lift the band from the bath, driven roller means outside said tank at said other end for receiving the band from said rolls to advance the band and serve to pull the band through the tank, said tank including a sill at said other end, said rolls being disposed at least in part in said tank to lift the band above the sill for conveyance to said driven roller means, said tank having a bottom including a plurality of longitudinal, parallel, open channels, said channels being transversely spaced across the entire width of the tank, each channel extending along the entire length of the tank, and means for circulating said bath along the length of the tank in the direction of travel of the band, said bath extending to a level above said channels but being subdivided into respective streams in said channels.

2. Apparatus as claimed in claim 1 wherein said tank includes side walls defining said open channels, said means for heating the bath comprises heating elements in said side walls of said channels.

3. Apparatus as claimed in claim 2 wherein said rolls and driven rollers means are aligned to lift the band at an angle of 0° 10' to 0° 20' over the sill.

4. Apparatus as claimed in claim 3 wherein said tank is provided with a chamber at said one end at the entrance of the glass band into the tank, means providing communication between said chamber and the bath, said chamber being connected with the means which circulates the bath to receive the circulated bath, and a further sill at the bottom of the tank at the location where the band is introduced onto the bath at the front portion of the bath to smooth the flow of the bath thereover.

References Cited
UNITED STATES PATENTS

| | | | |
|---|---|---|---|
| 3,031,275 | 4/1962 | Shockley | 65—182 X |
| 3,395,996 | 8/1968 | Lookes | 65—182 X |
| 3,438,761 | 4/1969 | Eloy | 65—182 X |
| 3,361,550 | 1/1968 | Murphy et al. | 65—182 X |
| 3,486,873 | 12/1969 | Deustachio | 65—182 X |

ROBERT L. LINDSAY, JR., Primary Examiner

U.S. Cl. X.R.

65—99 A